United States Patent
Fan (10) Patent No.: US 12,127,255 B2
(45) Date of Patent: Oct. 22, 2024

(54) ADJUSTING METHOD FOR TERMINAL, TERMINAL, AND NON-TRANSITORY COMPUTER-STORAGE MEDIUM

(71) Applicant: GUANGDONG OPPO MOBILE TELECOMMUNICATIONS CORP., LTD., Dongguan (CN)

(72) Inventor: Hui Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 17/563,491

(22) Filed: Dec. 28, 2021

(65) Prior Publication Data

US 2022/0124809 A1 Apr. 21, 2022

Related U.S. Application Data

(63) Continuation of application No. PCT/CN2020/098537, filed on Jun. 28, 2020.

(30) Foreign Application Priority Data

Aug. 1, 2019 (CN) .......................... 201910706618.2

(51) Int. Cl.
*H04W 74/0816* (2024.01)
*H04W 72/0446* (2023.01)
*H04W 74/08* (2024.01)
*H04W 84/12* (2009.01)

(52) U.S. Cl.
CPC ... *H04W 74/0816* (2013.01); *H04W 72/0446* (2013.01); *H04W 74/0866* (2013.01); *H04W 84/12* (2013.01)

(58) Field of Classification Search
None
See application file for complete search history.

(56) References Cited

U.S. PATENT DOCUMENTS

| 2008/0057930 A1 | 3/2008 | Matsubara |
| 2008/0096561 A1 | 4/2008 | Liu et al. |
| 2011/0243013 A1 | 10/2011 | Lee et al. |

(Continued)

FOREIGN PATENT DOCUMENTS

| CN | 104412663 A | 3/2015 |
| CN | 105142203 A | 12/2015 |

(Continued)

OTHER PUBLICATIONS

The Second Office Action Dated Apr. 24, 2022 from Chinese patent application No. 202110671048.5, 15 pages.

(Continued)

*Primary Examiner* — Diane L Lo
(74) *Attorney, Agent, or Firm* — BAYES PLLC (57) ABSTRACT

An adjusting method for a terminal includes obtaining at least one channel parameter of a wireless fidelity (WIFI) channel within a first preset time period; and shortening a scan time period of the WIFI channel from a preset scan time period to a value smaller than a second preset time period in response to the at least one channel parameter of the WIFI channel representing that a channel environment type of the WIFI channel is simple. A terminal and a non-transitory computer-storage are also provided.

11 Claims, 4 Drawing Sheets

At least one channel parameter of a WIFI channel within a first preset time period is obtained — S301

When the at least one channel parameter of the WIFI channel represents that a channel environment type of the WIFI channel is simple, a scan time period of the WIFI channel is shortened from a preset scan time period to a value smaller than a second preset time period — S302

(56) References Cited

U.S. PATENT DOCUMENTS

| | | |
|---|---|---|
| 2014/0010089 A1 | 1/2014 | Cai et al. |
| 2015/0103680 A1 | 4/2015 | Anand et al. |
| 2015/0327044 A1 | 11/2015 | Shah et al. |
| 2017/0019924 A1* | 1/2017 | Wang .................... H04L 5/0092 |
| 2022/0141805 A1* | 5/2022 | Tooher .............. H04W 74/0808 370/336 |

FOREIGN PATENT DOCUMENTS

| | | |
|---|---|---|
| CN | 105813176 A | 7/2016 |
| CN | 106604402 A | 4/2017 |
| CN | 108337719 A | 7/2018 |
| CN | 108848547 A | 11/2018 |
| CN | 108924908 A | 11/2018 |
| CN | 109219075 A | 1/2019 |
| CN | 109618395 A | 4/2019 |
| CN | 109660990 A | 4/2019 |
| CN | 110337135 A | 10/2019 |
| WO | 2015074186 A1 | 5/2015 |
| WO | 2019055519 A1 | 3/2019 |

OTHER PUBLICATIONS

International Search Report and the Written Opinion Dated Sep. 15, 2020 From the International Searching Authority Re. Application No. PCT/CN2020/098537, 12 pages.

The first Office Action Date Dec. 25, 2020 from from China Application No. 201910706618.2, 13 pages.

The second Office Action Date Jan. 26, 2021 from from China Application No. 201910706618.2, 12 pages.

Notice of Allowance Date May 18, 2021 from from China Application No. 201910706618.2, 4 pages.

The first Office Action Date Jan. 4, 2022 from China Application No. 202110671048.5, 16 pages .

The supplementary European search report dated Aug. 25, 2022 from European patent Application No. 20848411.3.

The Notice of Allowance dated Sep. 20, 2022 from Chinese patent Application No. 202110671048.5.

Azzedine Boukerche et al, "A self-configured handoff scheme for IEEE 802.11—based wireless networks", Local Computer Networks, 2009. LCN 2009. IEEE 34th Conference on, IEEE, Piscataway, NJ, USA, Oct. 20, 2009.

\* cited by examiner

FIG. 6

ADJUSTING METHOD FOR TERMINAL, TERMINAL, AND NON-TRANSITORY COMPUTER-STORAGE MEDIUM

CROSS REFERENCE TO RELATED APPLICATIONS

This application is a continuation of International Application No. PCT/CN2020/098537, filed on Jun. 28, 2020, which claims the benefit of priority to Chinese Application No. 201910706618.2, filed on Aug. 1, 2019, the contents of which are incorporated herein by reference in their entireties.

TECHNICAL FIELD

The present disclosure relates to the technology field of adjusting a channel scan time period, and more particularly to an adjusting method for a terminal, a terminal, and a non-transitory computer-storage medium.

BACKGROUND

Currently, when wireless fidelity (WIFI) channels are scanned, the scanned channels are often reduced, and a scan interval is increased. Although there is a method to reduce a scan time period on each channel, the method sets a uniform residence time on all channels via a framework, a driver, or a firmware. This is not effective for each channel.

In practical applications, when a number of scan channels is reduced and the scan interval is increased, it is prone to fail to find a new wireless access point (AP) in a surrounding environment in real time. When the residence time of adjusting all channels is used (for example, the residence time can be set to be 50 ms, 80 ms, or 100 ms), this setting method has randomness and is not beneficial for scanning the channels. It can be seen that the conventional channel scan methods have long scan time periods. This causes high power consumption.

SUMMARY

The present disclosure provides an adjusting method for a terminal, a terminal, and a non-transitory computer-storage medium.

In a first aspect, an embodiment of the present disclosure provides an adjusting method for a terminal. The method includes: obtaining at least one channel parameter of a wireless fidelity (WIFI) channel within a first preset time period; and shortening a scan time period of the WIFI channel from a preset scan time period to a value smaller than a second preset time period in response to the at least one channel parameter of the WIFI channel representing that a channel environment type of the WIFI channel is simple.

In a second aspect, an embodiment of the present disclosure provides a terminal. The terminal includes a processor and a storage medium storing instructions executable by the processor. The storage medium relies on the processor to perform operations through a communication bus, and the instructions are executed by the processor to perform the adjusting method described above.

In a third aspect, an embodiment of the present disclosure provides a non-transitory computer-storage medium storing executable instructions. When the executable instructions are executed by one or more processors, the one or more processors perform the adjusting method described above.

DETAILED DESCRIPTION OF EMBODIMENTS

The technical solutions in the embodiments of the present disclosure are clearly and completely described in the following with reference to the accompanying drawings in the embodiments of the present disclosure.

Embodiment 1

An embodiment of the present disclosure provides an adjusting method. The method is for a terminal.

Figure 1:
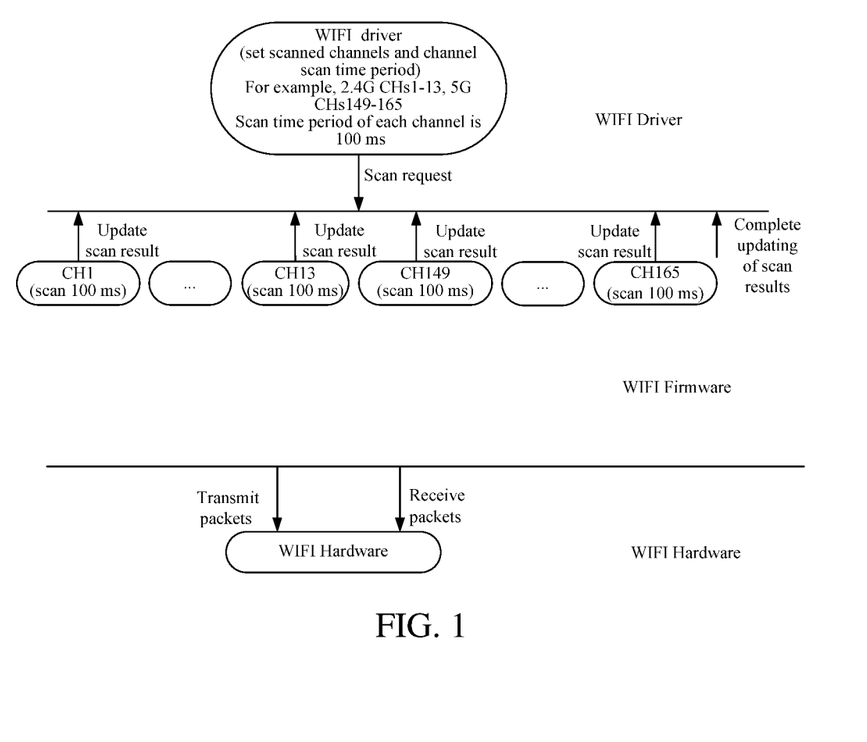
FIG. 1 illustrates a scan principle diagram in an unconnected scenario.

FIG. 1 illustrates a scan principle diagram in an unconnected scenario. As shown in FIG. 1, when the terminal is not connected to a WIFI router, the terminal sets scanned channels and a channel scan time period through a WIFI driver. The scanned channels include 2.4G CHs1-13 and 5G CHs149-165, and the scan time period of each channel is 100 ms. After receiving a scan request from the WIFI driver through a WIFI firmware, the terminal scans the CH1 channel according to the scan request. The scan time period is 100 ms. After the scan is completed, a scan result is returned to the WIFI driver to update the scan result of the CH1 channel. Then, the CHs2-13 channels are scanned in sequence, and the scan time period of each channel is 100 ms. After each channel scan is completed, scan results are returned to the WIFI driver to update the scan results of the CHs2-13 channels. Then, the CHs149-165 channels are scanned in sequence, and the scan time period of each channel is 100 ms. After each channel scan is completed, scan results are returned to the WIFI driver to update the scan results of the CHs149-165 channels. After the scan of the scan request is completed, the updating of the scan results is completed. The terminal receives and transmits packets through a WIFI hardware.

Figure 2:
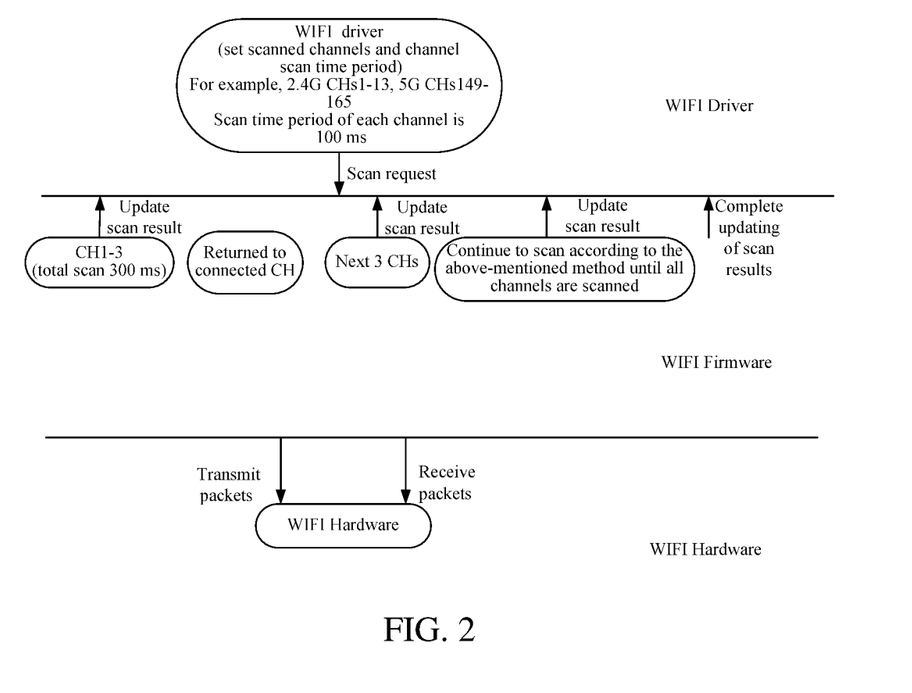
FIG. 2 illustrates a scan principle diagram in a connected scenario.

FIG. 2 illustrates a scan principle diagram in a connected scenario. As shown in FIG. 2, when the terminal is connected to the WIFI router, the terminal sets scanned channels and a channel scan time period through the WIFI driver. The scan channels include 2.4G CHs1-13 and 5G CHs149-165, and the scan time period of each channel is 100 ms. After receiving a scan request from the WIFI driver through the WIFI firmware, the terminal scans CHs1-3 channels according to the scan request. The scan time period of each channel is 100 ms, and a total scan time period is 300 ms. After the scan is completed, a scan result is returned to the WIFI driver to update the scan result of the CH1 channel. Then, a connection with a connected WIFI channel is resumed, and next three channels which are required to be scanned in the scan request are scanned. The scan time period of each channel is 100 ms. After the scan of each channel is completed, scan results are returned to the WIFI driver to update the scan results of the next three scan channels. Then, a connection with the connected WIFI channel is resumed. The rest can be deduced by analogy. After the scan of the scan request is completed, the updating of the scan results is completed. The terminal receives and transmits package through the WIFI hardware.

It can be seen that in the conventional scan methods, the channels to be scanned and the scan time period of each channel to be scanned are preset. For channels in a relatively simple environment, the scan time period may be too long. For channels in a relatively complicated environment, the scan time period may be too short. In practical applications, different scan time periods can be set for different channels. However, the scan time period is set randomly and is not set according to a practical situation of each channel. Accordingly, the scan time period is too long or too short. The long scan time period causes high power consumption. The short scan time period causes poor channel scan efficiency.

Figure 3:
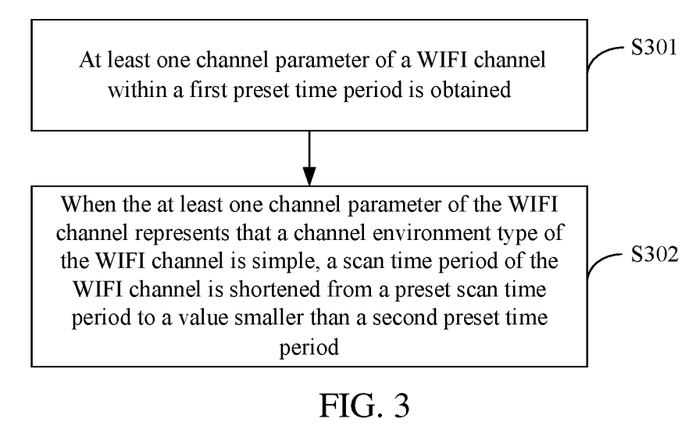
FIG. 3 illustrates a flowchart of an adjusting method for a terminal provided by an optional embodiment of the present disclosure.

In order to avoid the problem of high power consumption caused by the long scan time period, an embodiment of the present disclosure provides an adjusting method for a terminal. FIG. 3 illustrates a flowchart of an adjusting method for a terminal provided by an optional embodiment of the present disclosure. As shown in FIG. 3, the above-mentioned adjusting method can include the following operations.

In S301, at least one channel parameter of a WIFI channel within a first preset time period is obtained.

Herein, the WIFI channel can be detected within the first preset time period to obtain the at least one channel parameter of the WIFI channel within the first preset time period. The first preset time period can be within a preset scan time period or before the preset scan time period. The embodiment of the present disclosure is not specifically limited thereto.

In S301, a channel condition of the WIFI channel can be known by the at least one channel parameter of the WIFI channel obtained within the first preset time period. The at least one channel parameter of the WIFI channel includes an energy value of the WIFI channel and/or an idle slot ratio of the WIFI channel.

The energy value of the WIFI channel is a result of performing a clear channel assessment on the WIFI channel. The idle slot ratio of the WIFI channel is a proportion of an idle time of the WIFI channel within the preset first time period.

Specifically, a clear assessment situation can be obtained through the energy value of the WIFI channel, and the proportion of the idle time can be obtained through the idle slot ratio of the WIFI channel within the first preset time period. As such, an environment type of the WIFI channel can be obtained through the at least one channel parameter of the WIFI channel. For example, when the energy value is smaller and the idle slot ratio is larger, it means that an environment of the WIFI channel is relatively simple. When the energy value is larger and the idle slot ratio is smaller, it means that the environment of the WIFI channel is relatively complicated.

Herein, it should be noted that the above-mentioned at least one channel parameter of the WIFI channel can only include the energy value of the WIFI channel, or only include the idle slot ratio of the WIFI channel, or include the energy value of the WIFI channel and the idle slot ratio of the WIFI channel. The embodiment of the present disclosure is not specifically limited thereto.

In order to obtain the energy value of the WIFI channel, in an optional embodiment, when the at least one channel parameter of the WIFI channel includes the energy value of the WIFI channel, S301 can correspondingly include: obtaining the energy value of the WIFI channel by detecting, through a channel assessment mechanism of CCA, the WIFI channel within the first preset time period.

Specifically, a WIFI physical layer relies on a carrier sense multiple access with collision avoidance (CSMA/CA) mechanism to avoid conflicts. The mechanism is based on the clear channel assessment (CCA) in the physical layer. As such, data returned by a WIFI chip of the terminal is converted into data in units of per second. In practical applications, when the converted data in units of per second is smaller than 500, it indicates that the channel environment is basically and relatively clean.

For the idle slot ratio of the WIFI channel, a general unit of a slot is 9 us (1 s=$10^6$ us). That is, there are 1000 slots in 9 ms. So many slots can reflect whether the environment is clean. Furthermore, because so many slots are basic enough to avoid the jitter of the environment.

In S302, when the at least one channel parameter of the WIFI channel represents that a channel environment type of the WIFI channel is simple, a scan time period of the WIFI channel is shortened from a preset scan time period to a value smaller than a second preset time period.

After the at least one channel parameter of the WIFI channel is obtained in S301, the scan time period of the WIFI channel is shortened from the preset scan time period to the value smaller than the second preset time period when it is determined that the at least one channel parameter of the WIFI channel represents that the channel environment type of the WIFI channel is simple.

For example, the preset scan time period is 100 ms, and the second preset time period is a value smaller than or equal to 100 ms, such as 90 ms. When the at least one channel parameter of the WIFI channel represents that the channel environment type of the WIFI channel is simple, the scan time period of the WIFI channel is shortened to 20 ms.

In practical applications, the scan time period of the WIFI channel is generally more than 50 ms. Accordingly, in fact, 1 ms or 9 ms can be used to monitor the above-mentioned CCA and the idle slot ratio. This value proves that the environment is relatively clean, and thus the scan time period is appropriately shortened. In contrast, the scan time period is appropriately extended.

In order to achieve the adjustment of the preset scan time period of the WIFI channel, in an optional embodiment, when the at least one channel parameter of the WIFI channel includes the energy value of the WIFI channel and the idle slot ratio of the WIFI channel, S302 can correspondingly include: shortening the scan time period of the WIFI channel from the preset scan time period to the value smaller than the second preset time period, when the channel environment type is represented as being simple in response to the energy value of the WIFI channel being smaller than or equal to a first preset threshold and the idle slot ratio of the WIFI channel being larger than or equal to a second preset threshold.

That is, when the at least one channel parameter of the WIFI channel includes the energy value of the WIFI channel and the idle slot ratio of the WIFI channel, the energy value of the WIFI channel is compared with the first preset threshold, and the idle slot ratio of the WIFI channel is compared with the second preset threshold. When the energy value of the WIFI channel is smaller than or equal to the first preset threshold and the idle slot ratio of the WIFI channel is larger than or equal to the second preset threshold after the comparisons, it represents that at this time, the environment type of the WIFI channel is simple. Accordingly, the scan time period of the WIFI channel is shortened from the preset scan time period to the value smaller than the second preset time period.

For example, the preset scan time period is 100 ms, the second preset period is 90 ms, the first preset threshold is 500, and the second preset threshold is 95%. When the obtained energy value of the WIFI channel is 455 and the idle slot ratio of the WIFI channel is 96%, the energy value of the WIFI channel and the idle slot ratio represent, after the comparisons, that the channel environment type is simple. Accordingly, the scan time period of the WIFI channel is shortened from the preset scan period of 100 ms to 20 ms.

Herein, it should be noted that energy values of the WIFI channel and idle slot ratios of the WIFI channel in different ranges can correspond to different second preset time periods. Alternatively, energy values of the WIFI channel and idle slot ratios of the WIFI channel in different ranges can correspond to different shortened time periods, and the scan time period of the WIFI channel is adjusted to one of the shortened time periods. Herein, the embodiment of the present disclosure is not specifically limited thereto.

Furthermore, it should be noted that the above-mentioned adjusting method can be applied before the terminal scans the WIFI channel or can be applied when the terminal scans the WIFI channel. In the situation that the terminal scans the WIFI channel, in an optional embodiment, when the WIFI channel is scanned according to the preset scan time period of the WIFI channel, the preset scan time period includes the first preset time period and a remaining scan time period. S302 can correspondingly include: shortening the remaining scan time period of the WIFI channel to a value smaller than the second preset time period, when the at least one channel parameter of the WIFI channel represents that the channel environment type is simple, wherein the second preset time period is smaller than a difference between the preset scan period time period and the first preset time period.

Specifically, when the scan time period of the WIFI channel scanned by the terminal is set to the preset scan time period, the terminal scans the WIFI channel according to the preset scan time period of the WIFI channel. At this time, the preset scan time period includes the first preset time period and the remaining scan time period. That is, the preset scan time period is divided into two parts. A first part is the first preset time period, and a second part is the remaining scan time period. That is, the terminal obtains the energy value of the WIFI channel and the idle slot ratio of the WIFI channel within the first preset time period. When the energy value of the WIFI channel and the idle slot ratio of the WIFI channel represent that the channel environment type of the WIFI channel is simple, it means that the environment of the WIFI channel is relatively clean at this time. For this WIFI channel, the preset scan time period is too long, so the remaining scan time period of the WIFI channel is shortened to the value smaller than the second preset time period. Herein, the second preset time period is smaller than the difference between the preset scan period and the first preset time period. As such, the scan time period of the WIFI channel can be shortened by shortening the remaining scan time period, thereby achieving the purpose of adjusting the scan time period during the scan.

For example, the preset scan time period is 100 ms, the first preset time period is 9 ms, the second preset time period is 20 ms, the first preset threshold is 500, and the second preset threshold is 95%. When the obtained energy value of the WIFI channel is 455 and the idle slot ratio of the WIFI channel is 96%, the energy value of the WIFI channel and the idle slot ratio represent, after the comparisons, that the channel environment type is simple. Since the remaining scan time period is 100 ms-9 ms=91 ms, the remaining time period is shortened to 20 ms or a value smaller than 20 ms.

In order to achieve the adjustment of the preset scan time period of the WIFI channel, in an optional embodiment where the scan time period of the WIFI channel is short, after step S301, the method can include: representing the channel environment type to be complicated, when the energy value of the WIFI channel is larger than or equal to a third preset threshold and the idle slot ratio of the WIFI channel is smaller than or equal to a fourth preset threshold.

Specifically, when the at least one channel parameter of the WIFI channel includes the energy value of the WIFI channel and the idle slot ratio of the WIFI channel, the energy value of the WIFI channel is compared with the third preset threshold and the idle slot ratio of the WIFI channel is compared with the fourth preset threshold. When the energy value of the WIFI channel is larger than or equal to the first preset threshold and the idle slot ratio of the WIFI channel is smaller than or equal to the fourth preset threshold after the comparisons, it represents that the environment type of the WIFI channel is complicated. It means that the WIFI channel needs a longer scan time period.

In an optional embodiment where the environment type of the WIFI channel is complicated, the method can further include: extending the scan time period of the WIFI channel from the preset scan time period to a third preset time period, when the environment type of the WIFI channel is complicated, wherein the third preset time period is smaller than or equal to a maximum value of the preset scan time period.

That is, when the environment type of the WIFI channel is complicated, the scan time period of the WIFI channel can be adjusted from the preset scan time period to the third preset time period to increase the scan time period of the WIFI channel.

In order to ensure that the power consumption for scanning the WIFI channel is within a certain range, the preset scan time period should be in a range when the terminal sets the preset scan time period. Herein, it should be noted that the third preset time period cannot exceed the maximum value of the preset scan time period.

For example, the third preset threshold is 1000, and the fourth preset threshold is 45%. When the obtained energy value of the WIFI channel is 1100 and the idle slot ratio of the WIFI channel is 43%, the energy value of the WIFI channel and the idle slot ratio represent, after the comparisons, that the channel environment type is complicated. Accordingly, the scan time period of the WIFI channel is extended from the preset scan time period to the third preset time period.

The following example is given to illustrate the adjustment method described in the above-mentioned one or more embodiments.

Figure 4:
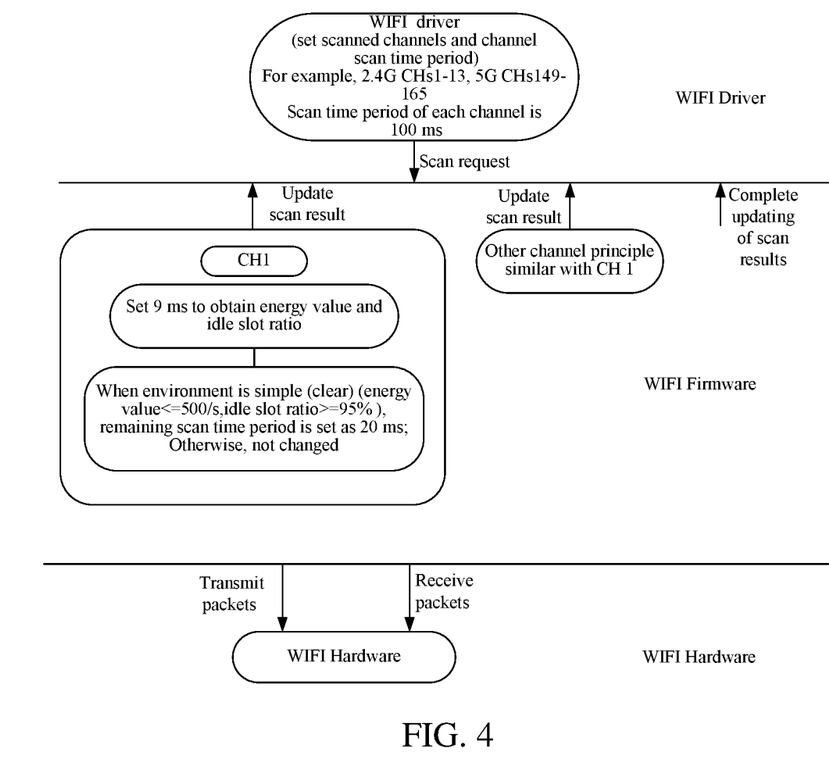
FIG. 4 illustrates a flowchart of an example of an adjusting method for a terminal provided by an optional embodiment of the present disclosure.

FIG. 4 illustrates a flowchart of an example of an adjusting method for a terminal provided by an optional embodiment of the present disclosure. Referring to FIG. 4, when a terminal is not connected to a router, the terminal sets scanned channels and a channel scan time period through a WIFI driver. The scanned channels include 2.4G CHs1-13 and 5G CHs149-165, and the scan time period of each channel is 100 ms. After receiving a scan request from the WIFI driver through a WIFI firmware, the terminal scans the CH1 channel according to the scan request. A preset scan time period is 100 ms. The preset scan time period includes a first preset time period and a remaining scan time period. The first present time period is 9 ms, the remaining scan time period is 91 ms, and a second present time period is 20 ms. The CH1 channel is detected in 9 ms through CCA to obtain an energy value of the CH1 channel and a duty slot ratio of the CH1 channel. Then, the energy value of the CH1 channel is compared with a first preset threshold, and the duty slot ratio of the CH1 channel is compared with a second preset threshold. The first preset threshold is 500, and the second preset threshold is 95%. When the energy value of the CH1 channel is smaller than or equal to 500 and the duty slot ratio of the CH1 channel is greater than or equal to 95% after the comparisons, the remaining scan time period is shortened to 20 ms. The CH1 channel is scanned using the scan time period of 20 ms to obtain a scan result, and the scan result is returned to the WIFI driver to update the scan result of the CH1 channel. Similarly, the CHs2-13 channels and the CHs149-165 are scanned in sequence using a scan method the same as the scan method of the CH1 channel, and the scan time period of each channel is 100 ms. After each channel scan is completed, scan results are returned to the WIFI driver to update the scan results of the CHs2-13 channels and the CHs149-165 channels. After the scan of the scan request is completed, the updating of the scan results is completed. The terminal receives and transmits packets through a WIFI hardware.

In the above-mentioned example, unnecessary long waiting time on a clean channel can be shortened, thereby shortening the overall scan time period. As such, the scan results can be obtained as soon as possible to be displayed faster, connections are faster, and related power consumption can also be reduced.

For example, taking 2.4G 13 CHs, 5G 5 CHs, and the scan time period of 20 ms as an example. In a non-connected scenario, it takes 1.8 s. In an extreme situation, only 1 channel has an AP. A baseline scan time period is 9 ms×17+99 ms=0.25 s, which is only 14% of the original scan time period. Certainly, in practice, 1 channel having an AP also has certain energy interference to 4 surrounding channels, so the actual time may be 9 ms×14+99 ms×4=0.5 s, which is 28% of the original scan time period. However, when it is considered that many countries have 5G channels more than 5 and dynamic frequency selection (DFS) has 30-40 channels, more time can be saved in some situations.

Furthermore, it should be noted that the above-mentioned adjusting method can also be combined with at least one mark transmitted from an upper layer. For example, in an Android system, the scan can be classified into a high accuracy scan, a low power scan, or a low latency scan. The high accuracy does not use this solution, and the low power scan and the low latency scan use this solution. As such, side effects can be reduced.

Moreover, when the environmental interference is perceived from other modules of the terminal or other parameters of the channel, the modules or the parameters can also be used as parameters of the adjusting method. For example, an adapter frequency hopping (AFH) channel of Bluetooth (BT) can be referred to. A BT channel itself cannot be used as a WIFI channel scan parameter. When the BT channel is working, it indicates that the channel is not very dirty. The channels which are not included are channels which the BT considers to be highly interfered in theory. These channels can be directly regarded as dirty channels.

In addition to monitoring for 9 ms first to observe the environment in the above-mentioned embodiment, it can also be considered that the monitoring for 9 ms is changed to send a probe request frame for a short period of time. Then, the monitoring is performed for 9 ms or other times. As such, a probe response frame from the AP can be used as energy monitoring, and the energy captured at this time requires a shorter time and is more accurate.

An embodiment of the present disclosure provides an adjusting method for a terminal. The method includes: obtaining at least one channel parameter of a WIFI channel within a first preset time period; and shortening a scan time period of the WIFI channel from a preset scan time period to a value smaller than a second preset time period, when the at least one channel parameter of the WIFI channel represents that a channel environment type of the WIFI channel is simple. That is, in the embodiment of the present disclosure, the at least one channel parameter of the WIFI channel within the first preset time period is obtained first. When the at least one parameter of the WIFI channel represents that the channel environment of the WIFI channel is simple and the scan is performed according to the originally set time period, a problem that the scan time period of the WIFI channel is too long exists. Herein, in order to avoid a problem of high power consumption caused by the long scan time period, when the channel environment of the WIFI channel is simple, the scan time period of the WIFI channel is shortened. That is, the scan time period of the WIFI channel is shortened according to the cleaner environment of the WIFI channel, thereby reducing the power consumption of the terminal.

Embodiment 2

Figure 5:
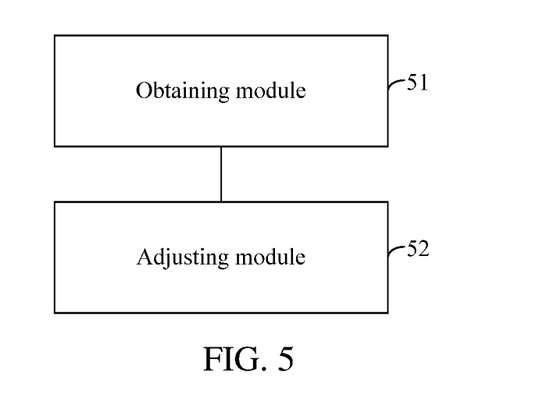
FIG. 5 illustrates a first structural diagram of a terminal provided by an embodiment of the present disclosure.

FIG. 5 illustrates a first structural diagram of a terminal provided by an embodiment of the present disclosure. As shown in FIG. 5, an embodiment of the present disclosure provides a terminal. The terminal can include:

an obtaining module 51 configured to obtain at least one channel parameter of a WIFI channel within a first preset time period; and an adjusting module 52 configured to shorten a scan time period of the WIFI channel from a preset scan time period to a value smaller than a second preset time period, when the at least one channel parameter of the WIFI channel represents that a channel environment type of the WIFI channel is simple.

Optionally, the at least one channel parameter of the WIFI channel includes an energy value of the WIFI channel and/or an idle slot ratio of the WIFI channel. The energy value of the WIFI channel is a result of performing a clear channel assessment on the WIFI channel. The idle slot ratio of the WIFI channel is a proportion of an idle time of the WIFI channel within the first preset time period.

Optionally, when the at least one channel parameter of the WIFI channel includes the energy value of the WIFI channel, correspondingly, the obtaining module 51 is specifically configured to: obtain the energy value of the WIFI channel by detecting, through a channel assessment mechanism of CCA, the WIFI channel within the first preset time period.

Optionally, when the at least one channel parameter of the WIFI channel includes the energy value of the WIFI channel and the idle slot ratio of the WIFI channel, correspondingly, the adjusting module 52 is specifically configured to: shorten the scan time period of the WIFI channel from the preset scan time period to the value smaller than the second preset time period, when the channel environment type is represented as simple in response to the energy value of the WIFI channel being smaller than or equal to a first preset threshold and the idle slot ratio of the WIFI channel being greater than or equal to a second preset threshold.

Optionally, when the WIFI channel is scanned according to the preset scan time period of the WIFI channel, the preset scan time period includes the first preset time period and a remaining scan duration, correspondingly, the adjusting module 52 is specifically configured to: shorten the remaining scan time period of the WIFI channel to a value smaller than the second preset time period, when the at least one channel parameter of the WIFI channel represents that the channel environment type is simple, wherein the second preset time period is smaller than a difference between the preset scan period time period and the first preset time period.

Optionally, after the at least one channel parameter of the WIFI channel within the first preset time period is obtained, the terminal is further configured to: represent the channel environment type as being complicated, when the energy value of the WIFI channel is greater than or equal to a third preset threshold and the idle slot ratio of the WIFI channel is smaller than or equal to a fourth preset threshold.

Optionally, the terminal is further configured to: extend the scan time period of the WIFI channel from the preset scan time period to a third preset time period, when the environment type of the WIFI channel is complicated, wherein the third preset time period is smaller than or equal to a maximum value of the preset scan time period.

In practical applications, the obtaining module 51 and the adjusting module 52 can be implemented by a processor located on a terminal, which is embodied as a central processing unit (CPU), a microprocessor unit (MPU), a digital signal processor, (DSP), a field programmable gate array (FPGA) and so on.

Figure 6:
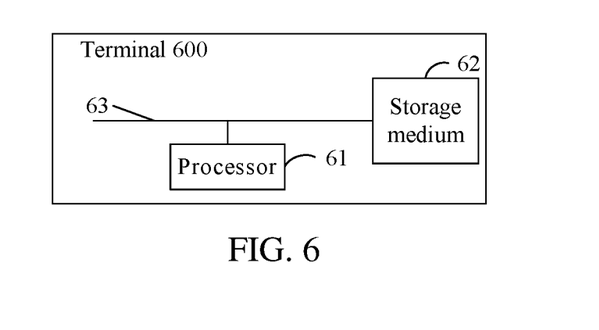
FIG. 6 illustrates a second structural diagram of a terminal provided by an embodiment of the present disclosure.

FIG. 6 illustrates a second structural diagram of a terminal provided by an embodiment of the present disclosure. As shown in FIG. 6, an embodiment of the present application provides a terminal 600 including: a processor 61 and a storage medium 62 storing instructions executable by the processor 61. The storage medium 62 relies on the processor 61 to perform operations through a communication bus 63, and the instructions are executed by the processor 61 to perform the adjusting method in any one of the above-mentioned embodiments.

It should be noted that in practical applications, various components in the terminal are coupled together through the communication bus 63. It can be understood that the communication bus 63 is configured to implement connections and communications among these components. In addition to a data bus, the communication bus 63 further includes a power bus, a control bus, and a status signal bus. However, for the sake of clarity, various buses are marked as the communication bus 63 in FIG. 6.

An embodiment of the present disclosure provides a computer-storage medium storing executable instructions. When the executable instructions are executed by one or more processors, the one or more processors perform the adjusting method in any one of the above-mentioned embodiments.

The computer-readable storage medium can be a magnetic random access memory (FRAM), a read only memory (ROM), a programmable read-only memory (PROM), an erasable programmable read-only memory (EPROM), an electrically erasable programmable read-only memory (EEPROM), a flash memory, a magnetic surface memory, a CD-ROM, a compact disc read-only memory (CD-ROM) and so on.

Those skilled in the art should understand that the embodiments of the present disclosure can be provided as a method, a system, or a computer program product. Therefore, the present disclosure can adopt the form of a hardware embodiment, a software embodiment, or an embodiment combining software and hardware. Moreover, the present disclosure can adopt the form of a computer program product implemented on one or more computer usable storage media (including but not limited to a disk storage, an optical storage and so on) containing computer usable program codes.

The solution of an embodiment of the present disclosure is described herein with reference to flowcharts and/or block diagrams of a method, an apparatus (system), and a computer program product according to the embodiments of the present disclosure. It should be understood that each flow and/or block in the flowchart and/or block diagram, and a combination of flow and/or block in the flowchart and/or block diagram may be implemented by computer program instructions. These computer program instructions may be provided to a general-purpose computer, a special-purpose computer, an embedded processor or a processor of other programmable data processing apparatus to form a machine, such that devices for implementing functions specified by one or more flows in a flowchart and/or one or more blocks in a block diagram may be generated by executing the instructions with the processor of the computer or other programmable data processing apparatus.

These computer program instructions may also be stored in a computer-readable memory that can direct a computer or other programmable data processing apparatus to function in a particular manner, such that the instructions stored in the computer readable memory produce a manufactured article including an instruction device, the instruction device implementing the functions specified by one or more flows in a flowchart and/or one or more blocks in a block diagram.

The computer program instructions may also be loaded into a computer or other programmable data processing apparatus, such that a series of process steps may be executed on the computer or other programmable data processing apparatus to produce a process implemented by the computer, and thereby, the instructions executed on the computer or other programmable data processing apparatus provide steps of the functions specified by one or more flows in a flowchart and/or one or more blocks in a block diagram.

The above descriptions are merely embodiments of the present disclosure and are not intended to limit the protection scope of the present disclosure.

What is claimed:

1. An adjusting method for a terminal, comprising:
obtaining at least one channel parameter of a wireless fidelity (WIFI) channel within a first preset time period; and
shortening a scan time period of the WIFI channel from a preset scan time period to a value smaller than a second preset time period in response to the at least one channel parameter of the WIFI channel representing that a channel environment type of the WIFI channel is simple;
wherein the at least one channel parameter of the WIFI channel comprises an energy value of the WIFI channel and an idle slot ratio of the WIFI channel, and the shortening the scan time period of the WIFI channel from the preset scan time period to the value smaller than the second preset time period in response to the at least one channel parameter of the WIFI channel representing that the channel environment type of the WIFI channel is simple comprises:
representing the channel environment type as being simple in response to the energy value of the WIFI channel being smaller than or equal to a first preset threshold and the idle slot ratio of the WIFI channel being greater than or equal to a second preset threshold; and shortening the scan time period of the WIFI channel from the preset scan time period to the value smaller than the second preset time period.

2. The method of claim 1, wherein the WIFI channel is scanned according to the preset scan period of the WIFI channel, and the preset scan period comprises the first preset period and a remaining scan time period; and the shortening the scan time period of the WIFI channel from the preset scan time period to the value smaller than the second preset time period comprises:

shortening the remaining scan time period of the WIFI channel to a value smaller than the second preset time period, wherein the second preset time period is smaller than a difference between the preset scan period time period and the first preset time period.

3. The method of claim 2, further comprising:

representing the channel environment type as being complicated in response to the energy value of the WIFI channel being greater than or equal to a third preset threshold and the idle slot ratio of the WIFI channel being smaller than or equal to a fourth preset threshold.

4. The method of claim 1, further comprising:

extending the scan time period of the WIFI channel from the preset scan time period to a third preset time period in response to the environment type of the WIFI channel being complicated, wherein the third preset time period is smaller than or equal to a maximum value of the preset scan time period.

5. A terminal, wherein the terminal comprises a processor and a storage medium storing instructions executable by the processor, the storage medium relies on the processor to perform operations through a communication bus, and the instructions are executed by the processor to perform:

obtaining at least one channel parameter of a wireless fidelity (WIFI) channel within a first preset time period; and shortening a scan time period of the WIFI channel from a preset scan time period to a value smaller than a second preset time period in response to the at least one channel parameter of the WIFI channel representing that a channel environment type of the WIFI channel is simple;

wherein the at least one channel parameter of the WIFI channel comprises an energy value of the WIFI channel and an idle slot ratio of the WIFI channel, and the shortening the scan time period of the WIFI channel from the preset scan time period to the value smaller than the second preset time period in response to the at least one channel parameter of the WIFI channel representing that the channel environment type of the WIFI channel is simple comprises:

representing the channel environment type as being simple in response to the energy value of the WIFI channel being smaller than or equal to a first preset threshold and the idle slot ratio of the WIFI channel being greater than or equal to a second preset threshold; and shortening the scan time period of the WIFI channel from the preset scan time period to the value smaller than the second preset time period.

6. The terminal of claim 5, wherein the WIFI channel is scanned according to the preset scan period of the WIFI channel, and the preset scan period comprises the first preset period and a remaining scan time period; and the shortening the scan time period of the WIFI channel from the preset scan time period to the value smaller than the second preset time period comprises:

shortening the remaining scan time period of the WIFI channel to a value smaller than the second preset time period, wherein the second preset time period is smaller than a difference between the preset scan period time period and the first preset time period.

7. The terminal of claim 6, further comprising:

representing the channel environment type as being complicated in response to the energy value of the WIFI channel being greater than or equal to a third preset threshold and the idle slot ratio of the WIFI channel being smaller than or equal to a fourth preset threshold.

8. The terminal of claim 5, further comprising:

extending the scan time period of the WIFI channel from the preset scan time period to a third preset time period in response to the environment type of the WIFI channel being complicated, wherein the third preset time period is smaller than or equal to a maximum value of the preset scan time period.

9. A non-transitory computer-storage medium, storing executable instructions, wherein when the executable instructions are executed by one or more processors, the one or more processors perform:

obtaining at least one channel parameter of a wireless fidelity (WIFI) channel within a first preset time period; and shortening a scan time period of the WIFI channel from a preset scan time period to a value smaller than a second preset time period in response to the at least one channel parameter of the WIFI channel representing that a channel environment type of the WIFI channel is simple;

wherein the at least one channel parameter of the WIFI channel comprises an energy value of the WIFI channel and an idle slot ratio of the WIFI channel, and the shortening the scan time period of the WIFI channel from the preset scan time period to the value smaller than the second preset time period in response to the at least one channel parameter of the WIFI channel representing that the channel environment type of the WIFI channel is simple comprises:

representing the channel environment type as being simple in response to the energy value of the WIFI channel being smaller than or equal to a first preset threshold and the idle slot ratio of the WIFI channel being greater than or equal to a second preset threshold; and shortening the scan time period of the WIFI channel from the preset scan time period to the value smaller than the second preset time period.

10. The non-transitory computer-storage medium of claim 9, wherein the WIFI channel is scanned according to the preset scan period of the WIFI channel, and the preset scan period comprises the first preset period and a remaining scan time period; and the shortening the scan time period of the WIFI channel from the preset scan time period to the value smaller than the second preset time period comprises:

shortening the remaining scan time period of the WIFI channel to a value smaller than the second preset time period, wherein the second preset time period is smaller than a difference between the preset scan period time period and the first preset time period.

11. The non-transitory computer-storage medium of claim 10, further comprising:
   representing the channel environment type as being complicated in response to the energy value of the WIFI channel being greater than or equal to a third preset threshold and the idle slot ratio of the WIFI channel being smaller than or equal to a fourth preset threshold.

* * * * *